United States Patent [19]

Sano

[11] Patent Number: 4,482,102
[45] Date of Patent: Nov. 13, 1984

[54] WEBBING-LOCK MECHANISM SUITABLE FOR USE IN VEHICLE SEAT BELT

[75] Inventor: Yasumasa Sano, Fujisawa, Japan

[73] Assignee: NSK-Warner K.K., Japan

[21] Appl. No.: 445,454

[22] Filed: Nov. 30, 1982

[30] Foreign Application Priority Data

Dec. 11, 1981 [JP] Japan .................. 56-184406[U]

[51] Int. Cl.³ .................. A62B 35/02; B65H 75/48
[52] U.S. Cl. .................. 242/107.2; 188/65.1
[58] Field of Search .................. 242/107.2, 107.4 A; 280/806–808; 297/478–480; 188/65.1

[56] References Cited

U.S. PATENT DOCUMENTS 4,249,708  2/1981  Asano .................. 242/107.2
4,383,659  5/1983  Okabe .................. 242/107.2

Primary Examiner—John M. Jillions
Attorney, Agent, or Firm—McGlew and Tuttle

[57] ABSTRACT

The specification describes a webbing-locking mechanism suitable for use in vehicle seat belt. The mechanism includes a guide roller, a ratchet gear rotatable integrally with the guide roller, a ratchet lever capable of assuming either engagement position where the ratchet lever is in complete engagement with the ratchet gear or non-engagement position where the ratchet gear is allowed to undergo free rotation, and a pawl capable of assuming either a first position where the pawl is in engagement with the guide roller or a second position where the pawl is out of engagement with the guide roller. When a tensile force of a predetermined value or greater is applied to the webbing, the ratchet lever is brought into engagement with the ratchet gear. When the guide roller has been turned further and the ratchet lever has been moved to the engagement position, the pawl is caused to move to the first position. The above structure is effective to shorten the time required until the guide roller has been fully stopped, in other words, to minimize the length of the webbing which may be pulled out of a retractor in the event of emergency.

3 Claims, 5 Drawing Figures

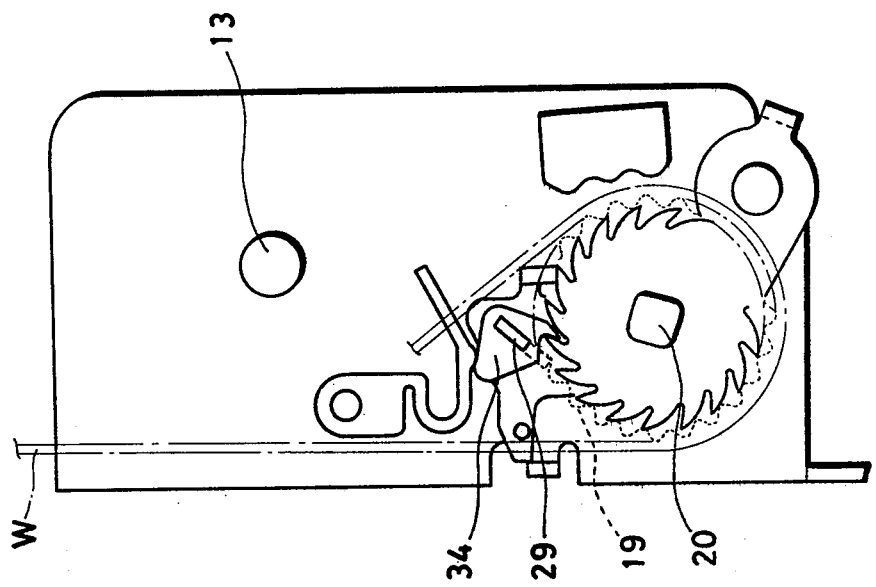
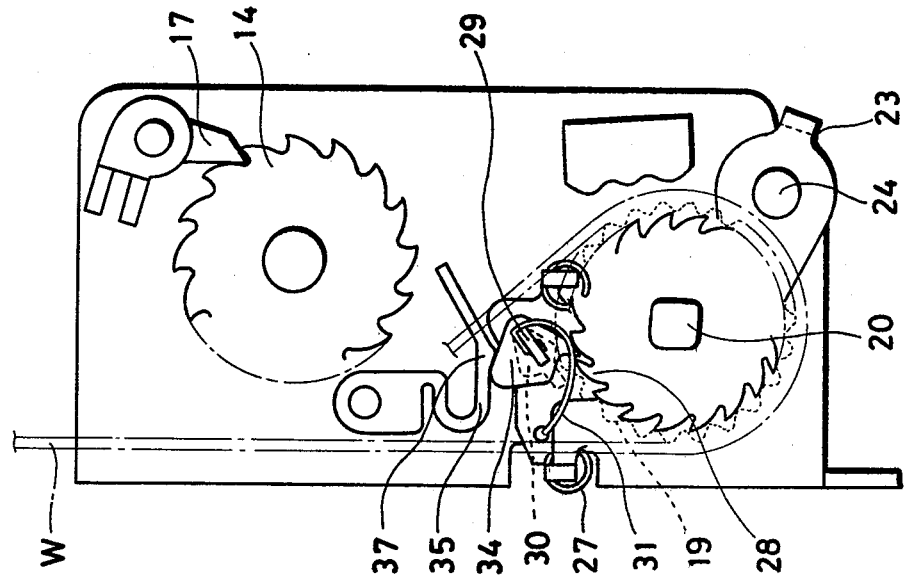

WEBBING-LOCK MECHANISM SUITABLE FOR USE IN VEHICLE SEAT BELT

BACKGROUND OF THE INVENTION (1) Field of the Invention

This invention relates to a webbing-locking mechanism suitable for use in a vehicle seat belt.

(2) Description of the Prior Art

In order to effectively restrain each vehicle occupant in the event of emergency such as vehicle collision or the like, a variety of improvements have been made to various devices, mechanisms or systems used in seat belts. In the field of retractors which are adapted to take up webbings fastened on vehicle occupants, a wide variety of proposals have been made to directly clamp each webbing at the outlet side of its corresponding retractor so as to minimize the length of the webbing which may be pulled out of the retractor in the event of emergency, for example, to firmly hold the webbing between a guide roller allowing the webbing to extend over a predetermined length of its circumference and a clamp member fixedly provided on a base.

In prior art webbing-locking mechanisms of the above-mentioned sort, each webbing-locking mechanism is so constructed that rotation of its guide roller is stopped directly by a pawl. Accordingly, such conventional webbing-locking mechanisms involve a danger that vehicle occupants may not be fully protected because their pawls may be struck back by their corresponding guide rollers or may slide on their corresponding guide rollers, thereby failing to stop the guide rollers surely and thus allowing their respective webbings to be pulled out of the retractors over such lengths as correspond to their tightened lengths in the retractors and allowing the webbings to slippingly pass between the guide rollers and their matching clamp members.

It seems to be effective to stop rotation of each guide roller in two or more steps in order to overcome such drawbacks of the prior art webbing-locking mechanism. An example of a guide roller equipped with a two-step locking mechanism is seen in U.S. Pat. No. 4,249,708 issued Feb. 10, 1981 to Shuichi Asano, especially, in FIGS. 12–14 of the Asano patent. A movement of a transmission lever causes an auxiliary pawl to engage with its corresponding auxiliary gear. However, this locking mechanism requires the transmission lever and a heavy pendulum as impact sensing means in order to activate the first and second pawl surely via the transmission lever. Coupled with the long drive-force transmission path from the pendulum, the above mechanism is accompanied by drawbacks that the locking mechanism is unavoidably large and complex as a whole.

SUMMARY OF THE INVENTION

With the foregoing problem in view, it is an object of this invention to provide a webbing-locking mechanism which is capable of stopping, without any failure, rotation of a guide roller without need for any impact sensing means and thus locking the webbing surely to prevent it from being pulled out.

The present inventor has found that the above object can be achieved by providing a ratchet gear with the guide roller and its corresponding ratchet lever and stopping the guide roller in two steps while making use of a movement of the guide roller upon application of a tensile force to the webbing because a main pawl is prevented from being struck back by the guide roller or from sliding on the guide roller.

In one aspect of this invention, there is thus provided a webbing-locking mechanism suitable for use in a vehicle seat belt to clamp a webbing paid out from a take-up reel so as to inhibit any movement of the webbing, which mechanism comprises:

(a) a guide roller allowing the webbing to extend over a predetermined length of its circumference which defines an interlocking surface;

(b) a ratchet gear rotatable integrally with the guide roller;

(c) a ratchet lever capable of assuming either engagement position where the ratchet lever is in complete engagement with the ratchet gear or non-engagement position where the ratchet gear is allowed to undergo free rotation; and (d) a pawl capable of assuming either first position where the pawl is in engagement with the guide roller or second position where the pawl is out of engagement with the guide roller;

thereby bringing the ratchet lever into engagement with the ratchet gear when a tensile force of a predetermined value or greater has been applied to the webbing and the guide roller has thus been moved and, then, causing the pawl to move to the first position when the guide roller has been turned further and the ratchet lever has been moved to the engagement position.

In another aspect of this invention, the above webbing-locking mechanism further comprises guide means adapted to guide the ratchet lever from the non-engagement position to the engagement position so that the ratchet lever is guided to the engagement position.

According to the above aspects of this invention, the guide roller is stopped in two steps and the pawl is thus successfully prevented from being struck back by the guide roller or from sliding on the guide roller, thereby ensuring the locking of the webbing.

In a further aspect of this invention, the above ratchet lever and pawl may be provided as integral parts. Accordingly, the pawl is brought into engagement with the guide roller at the same time as the ratchet lever is brought into engagement with the ratchet gear provided integrally with the guide roller, thereby precisely bringing the interlocking surface of the guide roller into engagement with the pawl and allowing the interlocking surface of the guide roller to register with the wave-patterned surface of the clamp member. Furthermore, the pawl and ratchet lever are moved as integral parts, thereby bringing about another advantage that the time required until rotation of the guide roller has been completely stopped can be shortened.

The above and other objects, features and advantages of the present invention will become more apparent from the following description and the appended claims, taken in conjunction with the accompanying drawings.

BRIEF DESCRIPTION OF THE DRAWINGS

FIG. 3 is a simplified side view of the webbing-locking mechanism of FIG. 1, in which the take-up reel has been locked and the pawl of the ratchet lever has been brought to a position where it is engageable with the ratchet gear;

FIG. 4 is a simplified side view of the webbing-locking mechanism of FIG. 1, in which the pawl of the ratchet lever has been brought into deep engagement with the ratchet gear.

DETAILED DESCRIPTION OF THE INVENTION AND PREFERRED EMBODIMENT

Figure 1:
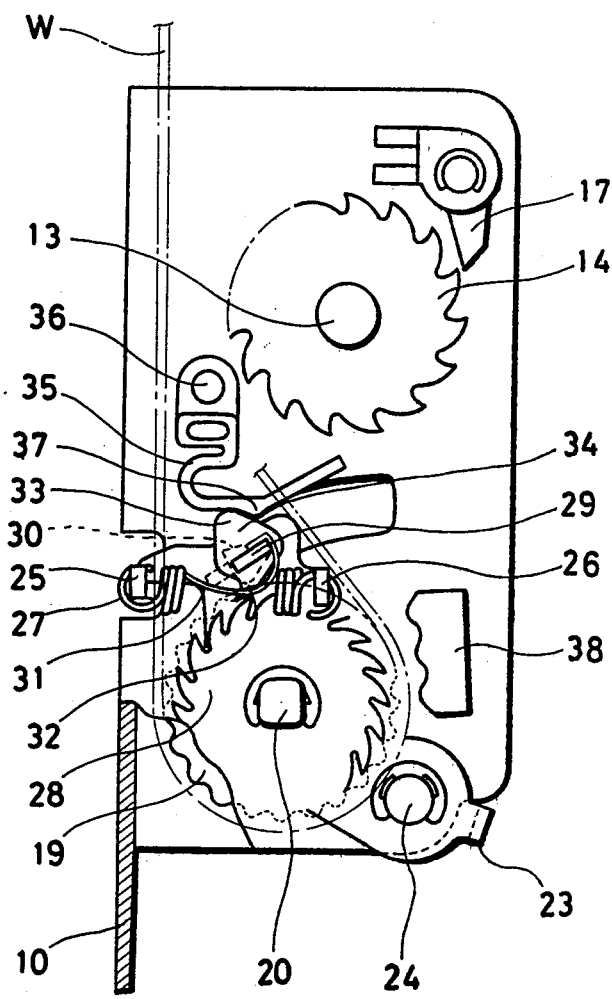
FIG. 1 is a simplified side view of the webbing-locking mechanism according to one embodiment of this invention.
Figure 2:
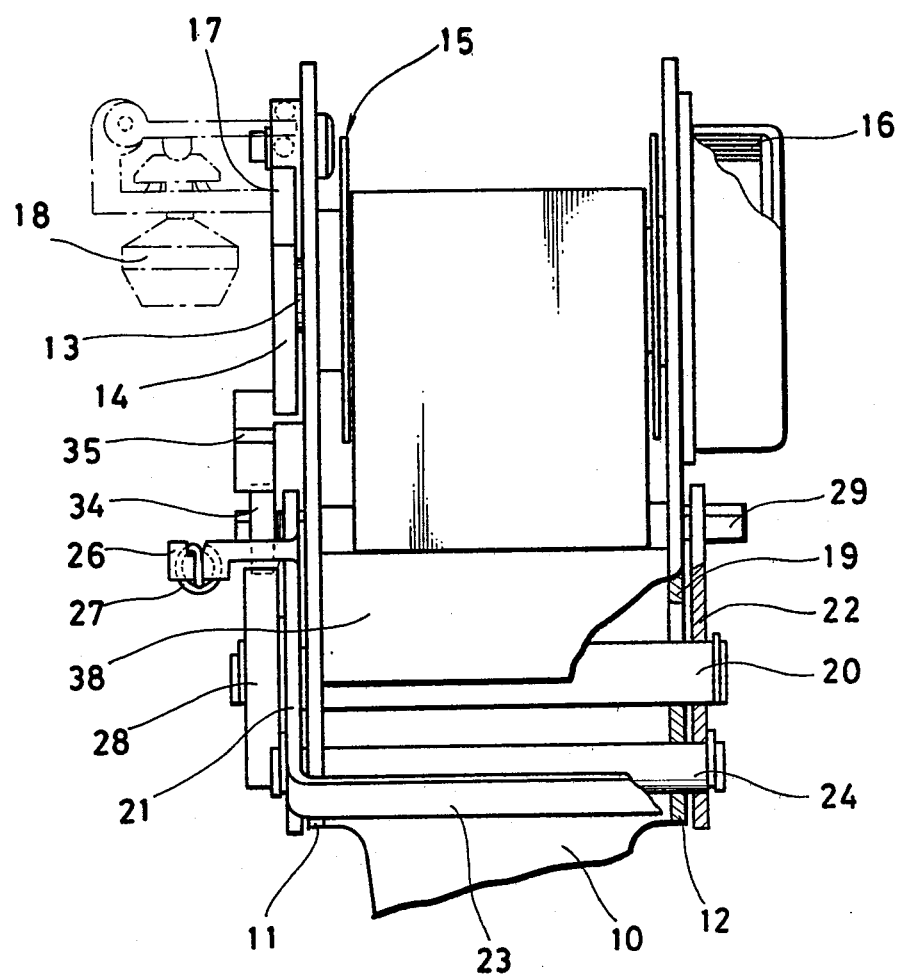
FIG. 2 is a front view of the webbing-locking mechanism of FIG. 1.

Reference is first made to FIGS. 1 and 2, in which a reel shaft 13 is provided between both side plates 11,12 at an upper part of a base 10. A ratchet gear 14 is provided integrally with the reel shaft 13 so as to make up a take-up reel 15. One end of a webbing W is fastened on the take-up reel 15 by a method commonly known in the art. The webbing W is wound in layers over the reel shaft 13. Outside the side plate 12, a take-up spring 16 is provided so as to bias the take-up reel 15 normally in the webbing-winding direction (namely, in the clockwise direction as seen in FIG. 1).

At the upper right of the take-up reel 15, a latch piece 17 is pivotally supported. The latch piece 17 is activated by a pendulum 18 which serves as an inertia sensor and, in the event of emergency, is brought into engagement with the ratchet gear 14.

On the other hand, at a lower part of the base 10, a guide roller 19 is rotatably supported on a roller shaft 20. The circumference of the guide roller 19 is formed in a wavy pattern to ensure the clamping of the webbing W between the guide roller 19 and its matching clamp plate 38 which will be described later in this specification. The roller shaft 20 is supported by a support lever 23 formed approximately into a square U-shape. Both leg portions 21,22 of the support lever 23 are disposed outside their corresponding side plates 11,12. The lever 23 is swingable about a lever shaft 24. Through the side plates 11,12 of the base 10 are formed release slots for the roller shaft 20. The guide roller 19 is normally held in a position as shown in FIG. 1 by virtue of the biasing force of a coil spring 27 which is hooked at one end thereof on a lug 25 of the base 10 and at the other end thereof on another lug 26 formed on the lever 23. In addition, a ratchet gear 28 is provided at the side of the side plate 11 and outside the lever 23 in such a way that the ratchet gear 28 rotates, via the roller shaft 20, as an integral part with the guide roller 19.

Above the guide roller 19, a pawl 29 which may be brought into engagement with the wave-patterned interlocking surface formed on the circumference of the guide roller 19 extends through the side plates 11,12 of the base 10 and is loosely inserted into sector-shaped openings 30 formed respectively through the leg portions 21,22 of the lever 23. The pawl 29 is normally biased in the clockwise direction (namely, in the direction where the pawl does not engage with the guide roller 19) by means of a latch spring 31. The pawl 29 is provided as an integral part with a ratchet lever 34 which defines a tooth 32 and a shoulder 33. By guiding the ratchet lever 34 along a guide wall 35, the pawl 29 is operably engaged with or disengaged from the guide roller 19.

The guide wall 35 is fixedly secured on the side plate 11 by means of a rivet 36. It is bent upwardly at its central bumpy part 37.

At the right of the guide roller 19, the clamp plate 38 is fixedly provided between the side plates 11 and 12 of the base.

Figure 5:
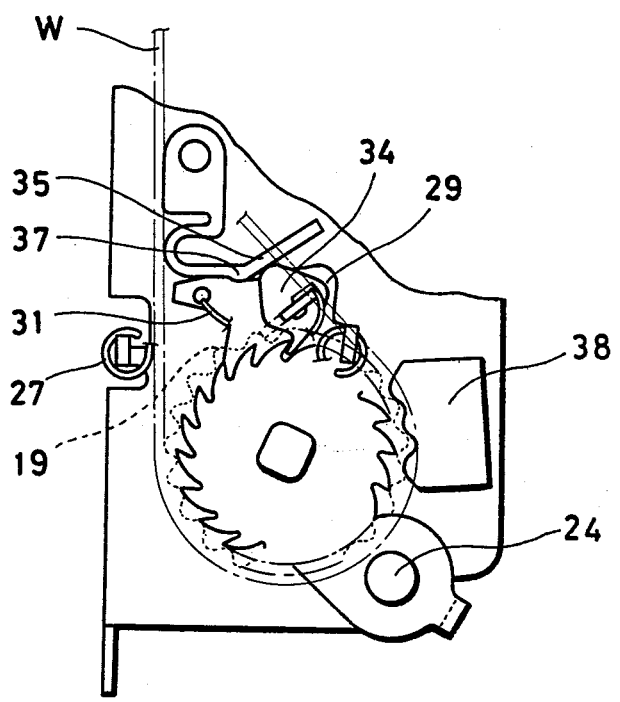
FIG. 5 is a simplified fragmentary side view of the webbing-locking mechanism of FIG. 1, in which the guide roller has been displaced rightwards as seen in the drawing and the webbing is firmly held between the guide roller and its matching clamp plate.

The operation of the webbing-locking mechanism of the above structure will now be described, with further reference to FIGS. 3 to 5. The webbing W is paid out from the take-up reel 15, wrapped over the guide roller 19 and reversed there, and then guided upwardly normally in the state as illustrated in FIG. 1. In this state, the guide roller 19 is biased in the counter-clockwise direction about lever shaft 24 by the coil spring 27 acting on the lever 23, thereby maintaining a clearance sufficient to permit the free passage of the webbing W between the guide roller 19 and clamp plate 38. Since the pawl 29 is in a position where it permits free rotation of the guide roller 19, the webbing W may be freely paid out or taken up.

In the event of emergency, the pendulum 18 detects a sudden change of the vehicle speed and the latch piece 17 is thus brought into engagement with the ratchet gear 14, thereby preventing any further rotation of the take-up reel 15. However, the webbing W is still pulled out because the occupant tends to move frontwards owing to an inertia force applied to the occupant. When a tensile force of a predetermined value or greater has been applied to the webbing W, the guide roller 19 overcomes the biasing force of the coil spring 27 and starts to swing clockwise about the lever shaft 24. Following the clockwise movement of the guide roller 19, the ratchet lever 34 integral with the pawl 29, loosely fit in the sector-shaped openings 30 formed through both leg portions 21,22 of the lever 23, is caused to move along the guide wall 35 and is then forced to turn counter-clockwise by the bumpy part 37 provided on the guide wall 37, thereby guiding the tooth 32 to a position where the tooth 32 is engageable with the ratchet gear 28. This state is illustrated in FIG. 3.

Incidentally, neither ratchet lever 34 nor the ratchet gear 28 is required to bear any load upon locking the guide roller 19. They are formed of a resin. This permits forming the tooth 32 of the ratchet lever 34 and teeth of the ratchet gear 28 into acute angles, thereby ensuring their full engagement without causing them to strike back or slip.

Since the guide roller 19 is slightly turned clockwise about the roller shaft 20 due to the tightening or the like of the webbing W wound over the take-up reel 15, the ratchet lever 34 and ratchet gear 28 are brought into their interlocked position where they are kept in still deeper engagement (see, FIG. 4).

As apparent from FIG. 4, simultaneously with the movement of the ratchet lever 34 and ratchet gear 28 into the still deeper mutual engagement, the pawl 29 is moved to a position where the pawl 29 is in engagement with the wave-patterned surface on the circumference of the guide roller 19. Here, the guide roller 19 is completely prevented from any further rotation. Since the ratchet lever 34 and pawl 29 are constructed as integral parts and thus activated simultaneously, the time required to stop the rotation of the guide roller 19 is practically the same as the time which is required until the pawl 29 is directly brought into engagement with the guide roller 19.

When a further pulling force is exerted to the webbing W owing to an inertia force applied to the occupant, the guide roller 19 is swung clockwise about the lever shaft 24 owing to a tensile force applied to the webbing W and a friction force developed between the webbing W and the circumference of the guide roller 19 while the guide roller 19 is prevented from any further rotation. Accordingly, the webbing W is held firmly between the guide roller 19 and the clamp plate 38 as depicted in FIG. 5.

Here, the engagement of the pawl 29 and the wave-patterned surface formed on the circumference of the guide roller 19 is always established in the same state as the pawl 29 is brought into engagement with the circumference of the guide roller 19 via an engagement of the ratchet lever 34 and ratchet gear 28. Accordingly, the wave-patterned surface of the guide roller 19 and that of the clamp plate 38 are allowed to hold the webbing W firmly therebetween with the ridges and grooves of the wave-patterned surface of the guide roller 19 registered respectively with the grooves and ridges of the wave-patterned surface of the clamp plate 38.

As soon as the tensile force has been released from the webbing W, the guide roller 19 is swung in the counter-clockwise direction about the lever shaft 24 owing to the biasing force of the coil spring 27. Following the counter-clockwise movement of the guide roller 19, the ratchet lever 34 is turned clockwise by the biasing force of the latch spring 31 when the shoulder 33 has overridden the bumpy part 37 of the guide wall 35. This permits the ratchet lever 34 to assume its normal position as shown in FIG. 1.

In the above embodiment, the retractor adapted to take up the webbing and the webbing-locking mechanism for allowing the webbing to extend over a predetermined length of the circumference of its guide roller and locking the webbing between the guide roller and clamp plate in the event of emergency are assembled as integral parts in the base. They may of course be assembled in separate bases if desired, for example, in view of their installation space.

Furthermore, a retractor, namely a take-up reel is used in the above embodiment. The present invention may also be applied to lock a webbing which is not fastened at one end thereof to a take-up reel. Reference may be made to U.S. Pat. No. 3,535,001 issued Oct. 20, 1979 to Gerald F. Lewis and Ronald J. Palmieri and U.S. Pat. No. 3,557,914 issued Jan. 26, 1971 to Akira Tanaka.

Having now fully described the invention, it will be apparent to one of ordinary skill in the art that many changes and modifications can be made thereto without departing from the spirit or scope of the invention as set forth herein.

What is claimed is:

1. A mechanism suitable for use in a vehicle seat belt to restrain movement of a webbing paid out from a take-up reel, said mechanism comprising:
   (a) a base;
   (b) a support lever supported swingably on the base;
   (c) a guide roller supported rotatably on the support lever, with the webbing extending over a predetermined length of the guide roller circumference;
   (d) a ratchet gear rotatable integrally with the guide roller and defining acute teeth;
   (e) a ratchet lever mounted on the support lever for movement between an engagement position where the ratchet lever is in complete engagement with the ratchet gear, an intermediate position where the ratchet lever is engageable with the ratchet gear and a non-engagement position where the ratchet lever is out of engagement with the ratchet gear, the ratchet lever having an acute tooth which is engageable with the teeth of the ratchet gear;
   (f) a pawl provided as an integral member with the ratchet lever and displaceable in the support lever between a first position where the pawl is in engagement with the guide roller so as to inhibit any rotation of the guide roller and a second position where the pawl is out of engagement with the guide roller so as to permit free rotation of the guide roller; and
   (g) guide means mounted on the base and, when the support lever turns, engageable with the ratchet lever so as to guide the ratchet lever from the non-engagement position to the intermediate position;
   whereby the ratchet lever is guided by said guide means from the non-engagement position to the intermediate position when a tensile force of at least a predetermined value is applied to the webbing to move the guide roller and swing the support lever, the tensile force on the webbing then causing the ratchet lever to move from the intermediate position to the engagement position and causing the pawl, which is integral with the ratchet lever, to move from the second position to the first position due to the displacement of the ratchet lever from the non-engagement position to the engagement position when the guide roller has been moved further by the tensile force applied to the webbing.

2. A mechanism as claimed in claim 1, wherein the circumference of the guide roller defines a wavy engagement surface which is engageable with the pawl.

3. A mechanism as claimed in claim 1, wherein a clamp plate is fixed on the base at a location so that after the guide roller has been arrested from rotation by its engagement with the pawl, the webbing is held between the clamp plate and the guide roller.

* * * * *